United States Patent [19]

Biegger

[11] Patent Number: 4,879,187

[45] Date of Patent: Nov. 7, 1989

[54] BATTERY TERMINAL FUSE

[75] Inventor: Dennis Biegger, North Ridgeville, Ohio

[73] Assignee: Eveready Battery Company, St. Louis, Mo.

[21] Appl. No.: 97,577

[22] Filed: Oct. 22, 1987

[51] Int. Cl.⁴ .................... H01M 14/00; H01M 2/26
[52] U.S. Cl. ........................................ 429/7; 429/65; 429/94; 429/161
[58] Field of Search .................... 429/7, 94, 65, 161

[56] References Cited

U.S. PATENT DOCUMENTS

| | | | |
|---|---|---|---|
| 4,188,460 | 2/1980 | Kang et al. | 429/7 |
| 4,315,364 | 2/1982 | Leffingwell | 429/7 |
| 4,452,869 | 6/1984 | Demoully et al. | 429/94 |
| 4,476,202 | 10/1984 | Wesner | 429/94 |
| 4,550,064 | 10/1985 | Yen et al. | 429/94 |
| 4,734,341 | 3/1988 | Descroix et al. | 429/62 |

*Primary Examiner*—Stephen J. Kalafut
*Attorney, Agent, or Firm*—Virgil B. Hill

[57] ABSTRACT

An electrochemical cell employing a conductive tab to provide an electronic path between a terminal of the cell and one of the active materials of the cell and wherein said conductive tab has a narrow strip portion which breaks when the current to the terminal exceeds a predetermined level.

12 Claims, 1 Drawing Sheet

U.S. Patent    Nov. 7, 1989    4,879,187
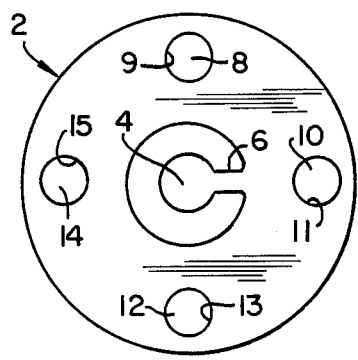
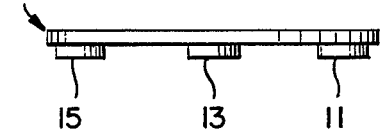
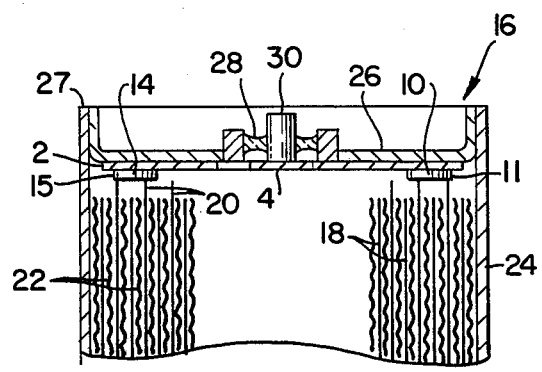
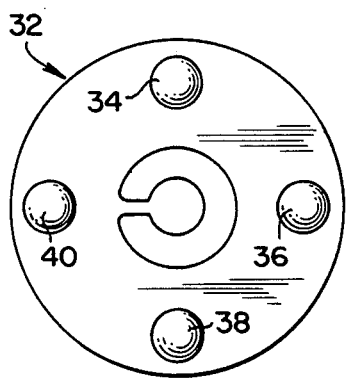
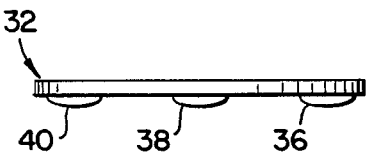

BATTERY TERMINAL FUSE

FIELD OF THE INVENTION

The invention relates to a battery terminal fuse which comprises a conductive tab to provide an electronic path between a terminal of the cell and one of the cell's active electrode material, said conductive tab having a narrow strip portion selected so that it will break or fuse when the current to the terminal exceeds a predetermined level.

BACKGROUND OF THE INVENTION

The galvanic cell has become a primary power source for many portable electronic devices such as tape recorders, portable telephones, lanterns, radios, hearing aids, watches, calculators and the like. In order to maintain the overall electronic devices as compact as possible, the electronic devices are usually designed with cavities to accommodate batteries as their power source. The cavities are usually made so that a battery can be snugly positioned therein, thus making electronic contact with appropriate terminals within the device. To accommodate the electronic component manufacturers, the battery industry has adapted several conventional size cells which the manufacturers can rely upon in designing their devices which require portable power sources. Due to the large number of battery-powered devices on the market, there has been a demand for increased power output capacities of standard size cells. Accordingly, various cell constructions have been employed so as to provide a sufficient output capacity to operate various devices. A problem has been encountered, however, when the cell is short circuited or discharged under abuse conditions which could produce a large current flow that could result in a high temperature rise in the cell. This elevated temperature rise could also produce excessive pressure build-up which independently or together could provide an environment within the cell inductive for an uncontrollable explosion to occur or rupture of the cell's housings.

Various preventive means have been employed in or on a cell to prevent excessive current flow such as would result from a short circuit. Many of these means require mechanical and/or electrical components to be assembled in or on the cell to break the current once the current exceed a predetermined level. These means have the disadvantage of adding cost to the production of the cell and in some instances occupy space that could be used for the active materials of the cell.

U.S. Pat. No. 4,188,460 discloses a battery employing an internal battery fuse which comprises a portion of a current collector that is thermally shielded so that excessive build-up of heat resulting from a short circuit is concentrated in said portion and which heat fuses the shielded portion and interrupts the circuit prior to excessive internal pressure conditions.

It is an object of the present invention to provide a battery terminal fuse that is cost effective to make and that occupies only a small space within the battery.

It is another object of the present invention to provide a novel safety means for interrupting or breaking the circuit once the current exceeds a predetermined value.

It is another object of the present invention to provide a single conductive tab that is not required to be thermally shielded and which will function to interrupt or break the circuit of the cell once the current exceeds a predetermined value.

The foregoing and additional objects will become fully apparent from the following description.

SUMMARY OF THE INVENTION

The invention relates to an electrochemical cell comprising an active anode material and an active cathode material assembled in a housing, said housing having a first terminal of the cell insulated from a second terminal of the cell and wherein said first terminal is in electronic contact with one of the active materials and said second terminal is in electronic contact with the other active material; a conductive tab providing an electronic path between said first terminal and the active material in electronic contact with said first terminal, said conductive tab comprising a first conductive portion integrally connected to the remaining portion of the conductive tab by a narrow conductive strip, said first conductive portion being secured to said first terminal and said remaining portion of the tab being in electronic contact with the active material, and wherein the width of the narrow strip is selected so that if the current in the cell exceeds a predetermined amperage, the strip will burn and break the electronic path to said first terminal thereby producing an open circuit in the cell.

The width of the narrow strip of the conductive tab of this invention is selected so that a current above a predetermined amount will burn or fuse the strip in a manner similar to what occurs to a conventional house fuse when the current exceeds its rated ampere capacity. One end of the conductive tab has to be secured to one terminal of the cell and assembled such that all the current to the terminal will be fed through the narrow strip of the conductive tab. The width of the narrow strip selected for breaking upon reaching a predetermined current level will depend on the material selected and the thickness of the material employed. For cylindrical cells, the conductive tab could be a circular disc having an arcuate shaped groove extending substantially concentric about the center of the disc. In this design a central portion of the disc would be integrally connected to the remaining portion of the disc by a narrow strip in which the edges of the narrow strip would define the ends of the arcuate groove. The central area portion of the conductive tab could be secured to a terminal of the cell such as a terminal secured in a glass-to-metal seal on a cover for the cell. The outer portion of the conductive tab could be electronically connected to one end of an active material for the cell. In this design, all the current flow from the cell would have to flow through the narrow strip so that by selecting the proper width of this strip, the narrow strip could break once the current flow exceeded a predetermined amount. For most applications the width of a nickel strip should be between about 0.02 inch and about 0.08 inch. To accommodate currents no higher than about 20 amperes, the width of a nickel strip should be between about 0.03 inch and about 0.07 inch preferably about 0.05 inch. Generally the fuse time to break the strip will occur within about 5 seconds. As stated above, the width of the strip will vary depending on the material selected and the thickness of the material.

An additional benefit of the above design for the conductive tab is that the central area would be able to flex about the narrow width above and below the plane of the tab without effectively distorting the peripheral area of the tab. Thus the central area of the tab connected to the terminal would flex upon bulging of the cell without disturbing the electronic continuity of the cell.

The tab for use in this invention can be made of any conductive material such as nickel plated steel, nickel foil, aluminum and stainless steel or a non-conductive material coated with a conductive layer, such as plastic films (polyester) coated with a metallic layer or a layer of conductive paint. Generally, this tab should be circular in shape to be compatible with the circular cells and relatively thin so that it can flex easily. For most applications the circular tab could be between about 0.001 inch and about 0.01 inch thick and more preferably between about 0.002 and 0.005 inch thick. The tab should be relatively thin so as to occupy only a small volume within the cell.

The conductive tab or battery terminal fuse of this invention is suited for all types of cell systems and all geometric shapes of cells. An ideal cell construction for use with the battery terminal fuse is a cell employing a coiled electrode assembly. A coiled electrode assembly typically comprises two electrode strips and a separator. One electrode strip acts as an anode or anode current collector and the other serves as a cathode or cathode current collector. The anode or anode current collector, cathode or cathode current collector and separator are made of flexible materials and are typically formed into strips and superimposed upon each other with one electrode overlapping the other. This is accomplished by superimposing and overlapping the first electrode strip over the second electrode strip with the separator interposed between the two electrode strips. This assembly is then wound to form the coiled electrode assembly which is preferably cylindrical in outer contour with a central opening and which preferably has at least the edge of one electrode strip protruding from the top or bottom of the electrode assembly. The central opening in the coiled electrode assembly is typically cylindrical, however, it could be elliptical or of any other configuration.

As used herein, an electrode strip shall mean an active electrode such as a solid anode or cathode of the cell or an electrochemically inactive strip such as an anode collector or a cathode collector employed along with an active liquid, solid or gas anode, or cathode, respectively.

In a preferred embodiment of the invention the cover could be a circular disc which could be insulated from the cell's container and used as one terminal for the cell. The cover could also employ a conventional glass-to-metal seal in which a conductive terminal within the glass seal could be electronically connected to the conductive tab thereby adapting the terminal as the electrode terminal for the cell. Other embodiments of the cover can be used with this invention.

When using a coiled electrode assembly for the cell construction, then the conductive tab would preferably be circular to accommodate the contour of the coiled electrode assembly. The coiled electrode assembly would have at least one electrode strip extending from the end of the assembly.

In the preferred embodiment of this invention the conductive tab would have at least one opening, preferably two or more equally spaced openings, disposed in the area between the peripheral edge of the tab and the concentric arcuate groove in the tab. The opening would be defined by an inward flange that would contact the protruding edge of the electrode strip extending from the end of the assembly and thus provide numerous contact points between the conductive tab and the edge of the electrode strip. Preferably three or more circular openings disposed concentrically about the concentric arcuate groove of the tab with each opening defined by an inwardly disposed flange would provide a substantial number of contact points between the edge of the electrode strip and the conductive tab. More preferred, the conductive tab should have four circular openings disposed concentrically about the concentric arcuate groove at intervals of 90° to provide multiple contact points between the conductive tab and the edge of the electrode strip. Thus, if one of the electronic connections between the flange and the electrode strip breaks, there still would be several contact points remaining for adequate electronic continuity.

In an alternate embodiment of the invention, the openings disposed in the area between the peripheral edge of the tab and the central area of tab could be replaced by inward protrusions such as dimples, these inward protrusions would contact the edge of the electrode strip and provide numerous contact points between the tab and the electrode strip.

The conductive tab of this invention can be used in many different types of cell systems such as aqueous (i.e., alkaline) or nonaqueous cell systems employing solid or liquid cathodes such as, for example, Lechanche dry cells, zinc chloride cells, alkaline-$MnO_2$ cells, nickel-cadmium cells, lead-acid cells and lithium nonaqueous cells. When the cell employs a coiled electrode assembly in a lithium nonaqueous system, it would sometimes be preferable to make the lithium the outer wound electrode. The lithium electrode strip could be superimposed and overlayed on a cathode strip such as $MnO_2$, $CuO$, $CF_x$, $FeS_2$ or the like with a separator interposed between them, and then wound with the edge of either or both electrodes protruding from the coiled electrode assembly.

The separator for use in this invention could be selected from a number of ionically permeable materials such as polypropylene, felted glass fibers and coated papers.

Cathode current collectors suitable for use in the invention would be sintered nickel or carbonaceous materials such as Teflon-bonded carbon or the like. Anode current collectors suitable for use in the invention would be nickel foil, stainless steel foil, expanded metal, perforated metal or the like.

The cylindrical container and cover for use in a preferred embodiment of this invention can be stainless steel, nickel-plated steel or some other conductive material that will not corrode or otherwise deteriorate when in contact with the active cell components. Preferably for nonaqueous systems the container and cover could be made of 304L, type stainless steel.

Any insulating gasket member disposed between the cover and the container has to be stable in the presence of the active components and discharge products and can be selected from such materials as nylon, polypropylene, polyethylene, polytetrafluoroethylene, fluorinated ethylene-propylene polymer, ethylene copolymer with fluorinated ethylenepropylene, polyester polychlorotrifluoroethylene, perfluoralkoxy polymer and the like.

Anodes suitable for use in some embodiments of this invention could be lithium, calcium, magnesium, sodium, zinc and the like. Cathodes suitable for use in some embodiments of this invention could be $MnO_2$, HgO, $Ag_2O$, CuO, $FeS_2$, $TiS_2$, $(CF_x)_n$ with x greater than 0 and less than 1.1, $SOCl_2$, $(C_2F)_n$, $SO_2Cl_2$ and $SO_2$. Some preferred cell systems for use in this invention would be as shown in the Table below.

TABLE

| Anode | Cathode | Electrolyte |
| --- | --- | --- |
| lithium | $MnO_2$ | organic |
| lithium | $SOCl_2$ | $LiAlCl_4$ in $SOCl_2$ |
| lithium | $(CF_x)_n$ | organic |
| zinc | $MnO_2$ | aqueous alkaline |
| cadmium | nickel hydroxide | aqueous alkaline |

When the anode for use in this invention is lithium, then a lithium foil could be secured onto a metallic conductive foil or carrier (anode collector) such a nickel.

The present invention will become more apparent from the following description thereof when considered together with the accompanying drawing which is set forth as being exemplary of embodiments of the present invention and is not intended in any way to be limitative thereof and wherein.

BRIEF DESCRIPTION OF THE DRAWINGS

FIG. 1 is a top plan view of a circular conductive tab for use in this invention.

FIG. 2 is a sectional elevational view of the conductive tab of FIG. 1.

FIG. 3 is a partial sectional elevational view of a cell employing the circular conductive tab of FIG. 1.

FIG. 4 is a top plan view of another embodiment of a circular conductive tab for use in this invention.

FIG. 5 is a sectional elevational view of the conductive tab of FIG. 4.

As shown in FIG. 1 and 2, circular conductive tab 2 has a central area 4 integrally connected to the remainder of tab 2 by thin strip 6. As apparent from FIG. 1 and 2, central area 4 can flex about strip 6 above or below the plane of tab 2. The design of the central area 4 produces a telescopic effect at the center of the tab 2. As discussed above, the width of strip 6 is selected so that if a current is produced in the cell above a certain amount, the strip will burn and break the electrical contact of the cell's circuit. Tab 2 also has four openings 8, 10, 12 and 14 spaced concentric about the central area 4 at 90° intervals. Each opening has an extended flange which is designed to make pressure contact with an edge of electrode strip of a coiled electrode assembly. Each flange 9, 11, 13 and 15 defining each opening 8, 10, 12 and 14, respectively, can be secured to the edge of an electrode strip using conventional means.

FIG. 3 shows a cross-section of a cell employing a coiled electrode assembly 16 comprising a first electrode strip 18, a second electrode strip 20 and a separator 22 therebetween housed in container 24. The first electrode strip 18 and second electrode strip 20 are superimposed and overlapping such that upon being coiled the edge of electrode strip 20 projects above the coiled electrode assembly. Tab 2 of FIG. 1 is shown in FIG. 3 disposed over the projected edge of electrode strip 20 such that flanges 11 and 15 physically contact the edge of electrode strip 20. All the flanges 9, 11, 13 and 15 are welded using conventional welding means to electronically and physically connect and secure tab 2 to electrode strip 20. A cover 26 is shown disposed over container 24 and secured to container 24 at its edge 27 using welding or similar conventional means. The cover 26 has a glass-to-metal seal 28 with a center terminal 30 which is secured to the center area 4 of tab 2 using conventional welding techniques. As is apparent from FIG. 3, if the cover 26 bulges, the central area 4 can flex without disturbing the electronic contact between the terminal and the electrode strip while at the same time if the current exceeds a predetermined amount, the narrow strip 6 shown in FIG. 1 will break or fuse and create an open circuit for the cell before any damage is done to the cell and/or the device in which it is assembled.

FIG. 4 and 5 show a circular conductive tab 32 similar to that shown in FIGS. 1 and 2 except the openings 8–14 have been replaced with inward protrusions 34, 36, 38 and 40. These protrusion or dimples are designed to make physical contact with the extending edge of an electrode strip in the same manner as the flanges 9, 11, 13 and 15 do in the FIG. 3.

Although preferred embodiments of this invention has been described in detail, it is contemplated that modifications and changes to the preferred embodiments of the invention herein shown and described can be made without departing from the spirit and scope of the invention.

What is claimed is:

1. An electrochemical cell comprising an active anode material and an active cathode material assembled in a container closed with a cover which has a terminal secured within and through said cover by a glass-to-metal seal and which terminal is a first terminal of the cell, which first terminal is insulated from a second terminal of the cell and wherein said first terminal is in electronic contact with one of the active materials and said second terminal is in electronic contact with the other active material; wherein a first electrode strip comprising the active cathode material superimposed on and overlapping a second electrode strip comprising the active anode material and a separator disposed between said first electrode strip and said second electrode strip are rolled into a coiled electrode assembly such that said first electrode strip is electronically insulated from said second electrode strip by said separator and an edge of at least one electrode strip protrudes from the coiled electrode assembly at one end and electronically contacts a conductive tab which tab in turn is secured to said first terminal in said cover; said conductive tab providing an electronic path between said first terminal and the active material in electronic contact with said first terminal, said conductive tab comprising a first conductive portion integrally connected to the remaining portion of the conductive tab by a narrow conductive strip, said first conductive portion being secured to said first terminal and said remaining portion of the tab being in electronic contact with the active material, and wherein the width of the narrow strip is selected so that if the current in the cell exceeds a predetermined amperage, the strip will burn and break the electronic path to said first terminal thereby producing an open circuit in the cell.

2. The electrochemical cell of claim 1 wherein said tab has at least one opening defined between the central area of the tab and the peripheral edge of the tab and said opening having a dependent flange that physically contacts the edge of the electrode strip extending from the coiled electrode assembly.

3. The electrochemical cell of claim 1 wherein tab has at least on inward protrusion between the control area of the tab and the peripheral edge of the tab and said protrusion physically contacts the edge of the electrode strip extending from the coiled electrode assembly.

4. The electrochemical cell of claim 1 employing an active cathode material selected from the group consisting of $SOCl_2$, $SO_2Cl_2$ and $SO_2$.

5. The electrochemical cell of claim 1 or 4 employing an organic electrolyte and wherein the active anode material is selected from the group consisting of $MnO_2$, $CuO$, $FeS_2$, and $TiS_2$.

6. The electrochemical cell of claim 4 wherein said active cathode material is in electronic contact with carbonaceous material and wherein said active cathode material is selected from the group consisting of $SOCl_2$, $SO_2Cl_2$ and $SO_2$.

7. The electrochemical cell of claim 1 wherein the active anode material is selected from the group consisting of lithium, sodium, calcium, magnesium and zinc.

8. The electrochemical cell of claim 1 wherein the active cathode material is selected from the group consisting of $MnO_2$, $CuO$, $Ag_2O$, $FeS_2$, $TiS_2$, $(CF_x)_n$ where x is larger than 0 and less than 1 and $(C_2F)_n$.

9. An electrochemical cell comprising an active anode material and an active cathode material assembled in a container closed with a cover which has a terminal secured within and through said cover by a glass-to-metal seal and which terminal is a first terminal of the cell, said first terminal being insulated from a second terminal of the cell and said first terminal being in electronic contact with one of the active materials and said second terminal being in electronic contact with the other active material; a conductive tab providing an electronic path between said first terminal and the active material, said conductive tab comprising a first conductive portion integrally connected to the remaining portion of the conductive tab by a narrow conductive strip, said first conductive portion being secured to said first terminal and said first terminal and said remaining portion of the tab being in electronic contact with the active material, wherein the conductive tab is thereby designed such that substantially all of the current flow from the cells flows through the narrow strip, and wherein the width of the strip is selected so that if the current in the cell exceeds a predetermined amperage, the strip will burn and break the electronic path to said first terminal thereby producing an open circuit in the cell, wherein said tab has at least one opening defined between the central area of the tab and the peripheral edge of the tab and said opening having a dependent flange that physically contacts the edge of an electrode strip extending from a coiled electrode assembly.

10. The electrochemical cell of claim 9, wherein said tab has at least one inward protrusion between the control area of the tab and the peripheral edge of the tab and said protrusion physically contacts an edge of the electrode strip extending from a coiled electrode assembly.

11. The electrochemical cell of claim 9, wherein a first electrode strip comprising said active cathode material superimposed on and overlapping a second electrode strip comprising said active anode material and a separator disposed between said first electrode strip and said second electrode strip is rolled into the coiled electrode assembly such that said first electrode strip is electronically insulated from said second electrode strip by said separator and the edge of at least one electrode strip protrudes from the coiled electrode assembly at one end and electronically contacts said dependent flange of the conductive tab which conductive tab in turn is secured to said terminal in said cover.

12. The electrochemical cell of claim 10, wherein a first electrode strip comprising said active cathode material superimposed on and overlapping a second electrode strip comprising said active anode material and a separator disposed between said first electrode strip and said second electrode strip is rolled into the coiled electrode assembly such that said first electrode strip is electronically insulated from said second electrode strip by said separator and the edge of at least one electrode strip protrudes from the coiled electrode assembly at one end and electronically contacts said protrusion of the conductive tab which conductive tab in turn is secured to said terminal in said cover.

* * * * *